United States Patent
Inose

(10) Patent No.: US 12,214,706 B2
(45) Date of Patent: Feb. 4, 2025

(54) VEHICLE SEAT

(71) Applicant: TS TECH CO., LTD., Asaka (JP)

(72) Inventor: Yasuo Inose, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 0 days.

(21) Appl. No.: 18/538,701

(22) Filed: Dec. 13, 2023

(65) Prior Publication Data

US 2024/0109468 A1    Apr. 4, 2024

Related U.S. Application Data

(63) Continuation of application No. 17/297,127, filed as application No. PCT/JP2019/045929 on Nov. 25, 2019, now Pat. No. 11,878,616.

(30) Foreign Application Priority Data

Nov. 27, 2018 (JP) .................................. 2018-221553
Sep. 27, 2019 (JP) .................................. 2019-177992

(51) Int. Cl.
*B60N 2/90* (2018.01)
*H04R 1/02* (2006.01)

(52) U.S. Cl.
CPC ............... *B60N 2/90* (2018.02); *H04R 1/025* (2013.01)

(58) Field of Classification Search
CPC .................................. B60N 2/90; H04R 1/025
See application file for complete search history.

(56) References Cited

U.S. PATENT DOCUMENTS

2016/0114703 A1    4/2016   Fujita et al.

FOREIGN PATENT DOCUMENTS

| JP | S 62/188258 U | 11/1987 |
| JP | 2012/153248 A | 8/2012 |
| JP | 2019/043294 A | 3/2019 |
| JP | 2019/077232 A | 5/2019 |

OTHER PUBLICATIONS

Extended European Search Report issued in 19888629.3, dated Jun. 24, 2022, 7 pages.
International Search Report and Written Opinion with English Translation issued in PCT/JP2019/045929, Dated Feb. 10, 2020, 15 pages.
Notice of Refusal (with English Translation) received in Application No. JP 2018-221553, dated Dec. 1, 2022, 6 pages.

*Primary Examiner* — Anthony D Barfield
(74) *Attorney, Agent, or Firm* — Dority & Manning, P.A.

(57) ABSTRACT

In a vehicle seat having sound generation source disposed between a seat frame and a cover member covering part of the seat frame from a side, a plate-shaped interposing part disposed between the seat frame and the sound generation source while opposing the seat frame is housed within the cover member, and a plurality of through holes are bored in the plate-shaped interposing part. Accordingly, a resonance space that is efficient and has a small size can be obtained within the cover member.

8 Claims, 18 Drawing Sheets

VEHICLE SEAT

CROSS REFERENCE TO RELATED APPLICATIONS

This application is a continuation of U.S. patent application Ser. No. 17/297,127 having a filing date of May 26, 2021, now U.S. Pat. No. 11,878,616, which is the U.S. National Stage entry of International Application No. PCT/JP2019/045929 filed under the Patent Cooperation Treaty having a filing date of Nov. 25, 2019, which claims priority to Japanese Patent Application No. 2018-221553 having a filing date of Nov. 27, 2018 and Japanese Patent Application No. 2019-177992 having a filing date of Sep. 27, 2019, all of which are incorporated herein by reference.

TECHNICAL FIELD

The present invention relates to a vehicle seat in which a sound generation source is disposed between a seat frame and a cover member covering part of the seat frame from a side.

BACKGROUND ART

An arrangement in which a waffle-shaped intermediate member is disposed between a shield (corresponding to the cover member of the present invention) covering a seat main body from the side and a drive motor, which is a sound generation source, and an attempt is made to reduce the operating noise generated by the drive motor by means of a resonator formed from the intermediate member and a lid member that has a plurality of apertures and is provided on an end part, on the drive motor side, of the intermediate member is known from Patent Document 1.

PRIOR ART DOCUMENTS

Patent Documents

Patent Document 1: Japanese Patent Application Laid-open No. 2012-153248

SUMMARY OF THE INVENTION

Problems to be Solved by the Invention

However, in the arrangement disclosed by Patent Document 1, since the intermediate member has a waffle shape, the resonator has a large size. Because of this, it is desirable that a cover member has in its interior a resonance space that is efficient and has a small size.

The present invention has been accomplished in light of such circumstances, and it is an object thereof to provide a vehicle seat that enables a resonance space that is efficient and has a small size to be obtained within a cover member.

Means for Solving the Problems

In order to attain the above object, according to a first aspect of the present invention, there is provided a vehicle seat having a sound generation source disposed between a seat frame and a cover member covering part of the seat frame from a side, characterized in that a plate-shaped interposing part disposed between the seat frame and the sound generation source while opposing the seat frame is housed within the cover member, and a plurality of through holes are bored in the plate-shaped interposing part.

Further, according to a second aspect of the present invention, in addition to the first aspect, the plate-shaped interposing part is provided on an intermediate member that is a separate body from the cover member and is disposed between the cover member and the sound generation source.

According to a third aspect of the present invention, in addition to the second aspect, a support wall part and a mounting plate part are provided on the intermediate member, the support wall part having one end part thereof provided so as to be connected to the plate-shaped interposing part and extending toward the cover member side, the mounting plate part being linked to the other end part of the support wall part, and the mounting plate part being fixed to the cover member.

According to a fourth aspect of the present invention, in addition to the second or third aspect, the intermediate member has a first protruding part provided so as to be connected to the plate-shaped interposing part on a side closer to a seated person with respect to the sound generation source and protruding toward a side going away from the cover member, and at least part, on the side close to the seated person, of the sound generation source is covered by the first protruding part.

According to a fifth aspect of the present invention, in addition to any one of the second to fourth aspects, the intermediate member has a second protruding part that is provided so as to be connected to the plate-shaped interposing part on a side farther from a seated person with respect to the sound generation source and protrudes toward the side going away from the cover member, and at least part, on the side distant from the seated person, of the sound generation source is covered by the second protruding part.

According to a sixth aspect of the present invention, in addition to the fifth aspect, the second protruding part is provided so as to be connected to the plate-shaped interposing part between the sound generation source and the support wall part, and a reinforcing part linked to the plate-shaped interposing part is provided on a side face, on the side opposite to the sound generation source, of the second protruding part.

According to a seventh aspect of the present invention, in addition to the fifth or sixth aspect, the intermediate member has a cover part covering the second protruding part from a side opposite to the sound generation source, and a second through hole is provided in the second protruding part.

According to an eighth aspect of the present invention, in addition to any one of the first to seventh aspects, a urethane pad is disposed between the plate-shaped interposing part and the sound generation source or the cover member.

According to a ninth aspect of the present invention, in addition to any one of the second to eighth aspects, the sound generation source radiates sound in a direction of an outer periphery of the sound generation source, and the intermediate member is disposed along part of the outer periphery of the sound generation source within a range over a portion, facing the plate-shaped interposing part side, of the sound generation source.

Moreover, according to a tenth aspect of the present invention, in addition to any one of the second to ninth aspects, the seat frame comprises a seat cushion frame that supports a seat cushion forming a seat part for an occupant, and a seat back frame that supports a seat back disposed above the seat cushion, and the cover member, the sound generation source and the intermediate member are disposed on at least one of the seat cushion frame and the seat back frame.

Effects of the Invention

In accordance with the first aspect of the present invention, it is possible, by utilizing effectively a portion of the cover member that opposes the plate-shaped interposing part having the plurality of through holes and facing the cover member, to define a space between the cover member and the plate-shaped interposing part as a resonance space, and it is possible to obtain an efficient and small resonance space within the cover member with a simple structure in which the plate-shaped interposing part, which occupies a small space, is disposed between the cover member and the sound generation source.

Furthermore, in accordance with the second aspect of the present invention, since the plate-shaped interposing part is provided on the intermediate member, which is a separate body from the cover member, it is possible to facilitate machining of the intermediate member having the plate-shaped interposing part and enhance the degree of freedom in placement of the intermediate member, and consequently the plate-shaped interposing part.

In accordance with the third aspect of the present invention, since the mounting plate part, which is linked to the other end part of the support plate part having the one end part thereof provided so as to be connected to the plate-shaped interposing part and extending toward the cover member side, is fixed to the cover member, it is possible to stably dispose the plate-shaped interposing part at a position spaced from the cover member.

In accordance with the fourth aspect of the present invention, since at least part, on the side close to a seated person, of the sound generation source is covered by the first protruding part provided so as to be connected to the plate-shaped interposing part on the side closer to the seated person with respect to the sound generation source, it is possible to silence effectively sound generated from the sound generation source on the side close to the seated person.

In accordance with the fifth aspect of the present invention, since at least part, on the side far from a seated person, of the sound generation source is covered by the second protruding part provided so as to be connected to the plate-shaped interposing part on the side farther from the seated person with respect to the sound generation source, it is possible to silence effectively sound generated from the sound generation source on the side far from the seated person. In particular, when the sound generation source is disposed on the seat back frame of the seat frame of a front seat, sound radiated toward a person seated on a rear seat can be silenced.

In accordance with the sixth aspect of the present invention, the strength of the plate-shaped interposing part can be enhanced by the reinforcing part provided on the side face, on the side opposite to the sound generation source, of the second protruding part and, in particular, at the time of an external force being inputted such as at the time of a vehicle side collision the cover member can be reinforced by the plate-shaped interposing part.

In accordance with the seventh aspect of the present invention, since the second protruding part having the second through hole is covered by the cover part from the side opposite to the sound generation source, a resonance space that is completed only by the intermediate member can be formed between the second protruding part and the cover part.

In accordance with the eighth aspect of the present invention, since the urethane pad is disposed between the plate-shaped interposing part and the sound generation source or cover member, in addition to the silencing effect due to the resonance space an effect in absorbing sound due to the urethane pad can also be obtained.

In accordance with the ninth aspect of the present invention, with regard to radiation from the sound generation source in the direction of its outer periphery, since the intermediate member is disposed along part of the outer periphery of the sound generation source over the range of a portion, facing the plate-shaped interposing part side, of the sound generation source, it is possible to efficiently silence the sound generated by the sound generation source.

Moreover, in accordance with the tenth aspect of the present invention, due to the cover member, the sound generation source, and the intermediate member being disposed on at least one of the seat cushion frame and the seat back frame, it becomes possible to suppress sound emitted from at least one of the seat cushion frame side and the seat back frame side toward the seated person side.

EXPLANATION OF REFERENCE NUMERALS AND SYMBOLS

Figure 1:
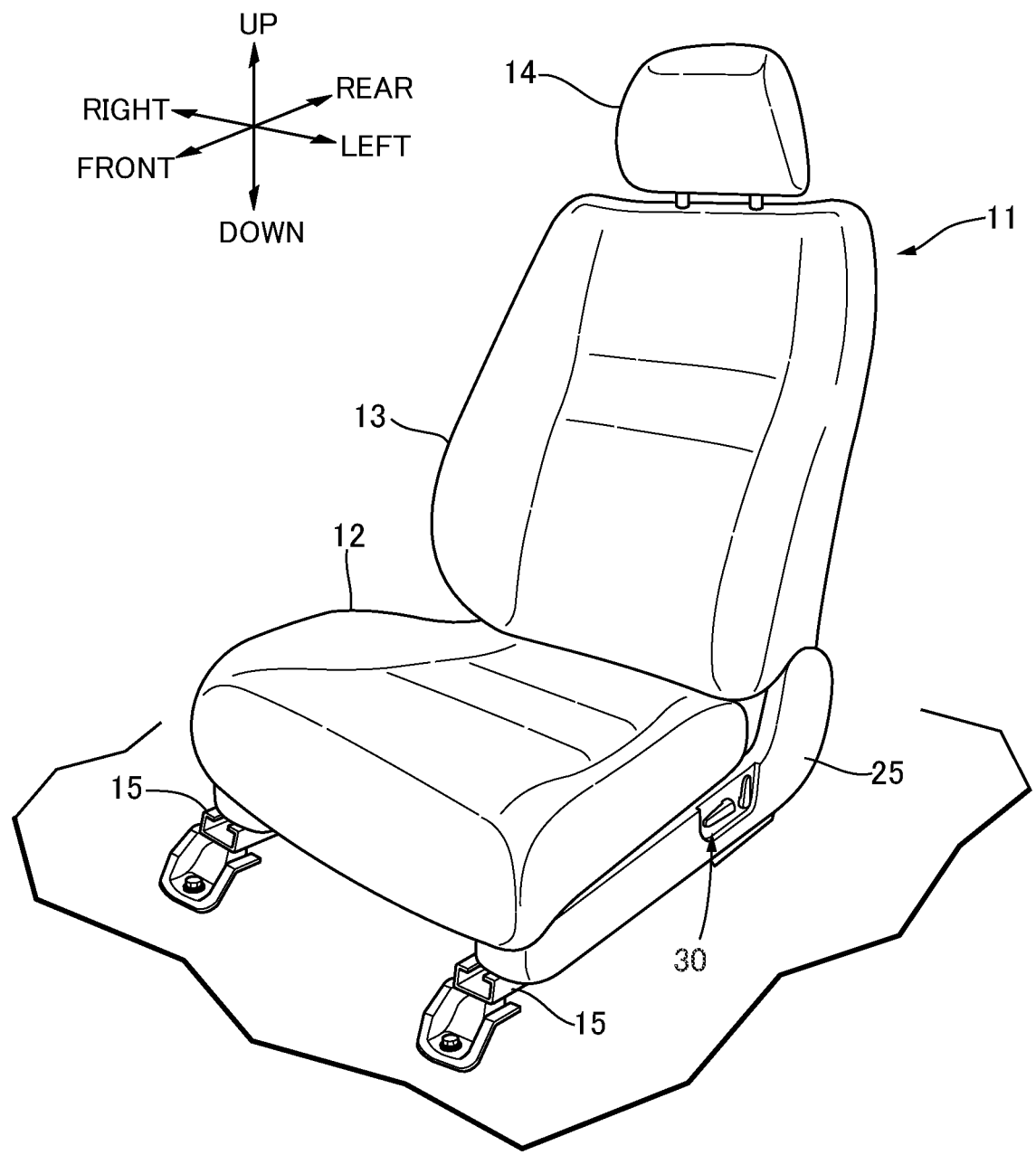
FIG. 1 is a perspective view of a vehicle seat of a first embodiment. (first embodiment)

11 Vehicle seat
12 Seat cushion
13 Seat back
17 Seat frame
18 Seat cushion frame
19 Seat back frame
25, 55, 65, 75, 85 Cover member
27 First electric actuator, which is a sound generation source
31A, 31B, 31C Plate-shaped interposing part
32, 43 Support wall part
33, 44 Mounting plate part
34 Through hole
35A, 35B, 35C, 35D, 35E, 35F, 35G, 35H, 35I Intermediate member
36 First protruding part
37A, 37B Second protruding part
38 Reinforcing part
39 Cover part
40 Second through hole
41 Urethane pad

MODES FOR CARRYING OUT THE INVENTION

Embodiments of the present invention are explained by reference to the attached drawings.

First Embodiment

A first embodiment of the present invention is explained below by reference to FIG. 1 to FIG. 5. First, in FIG. 1, a vehicle seat 11 installed in a vehicle includes a seat cushion 12 forming a seat part for an occupant and a seat back 13 disposed above the seat cushion 12, and a headrest 14 receiving a head part of the occupant is disposed on an upper part of the seat back 13.

Figure 2:
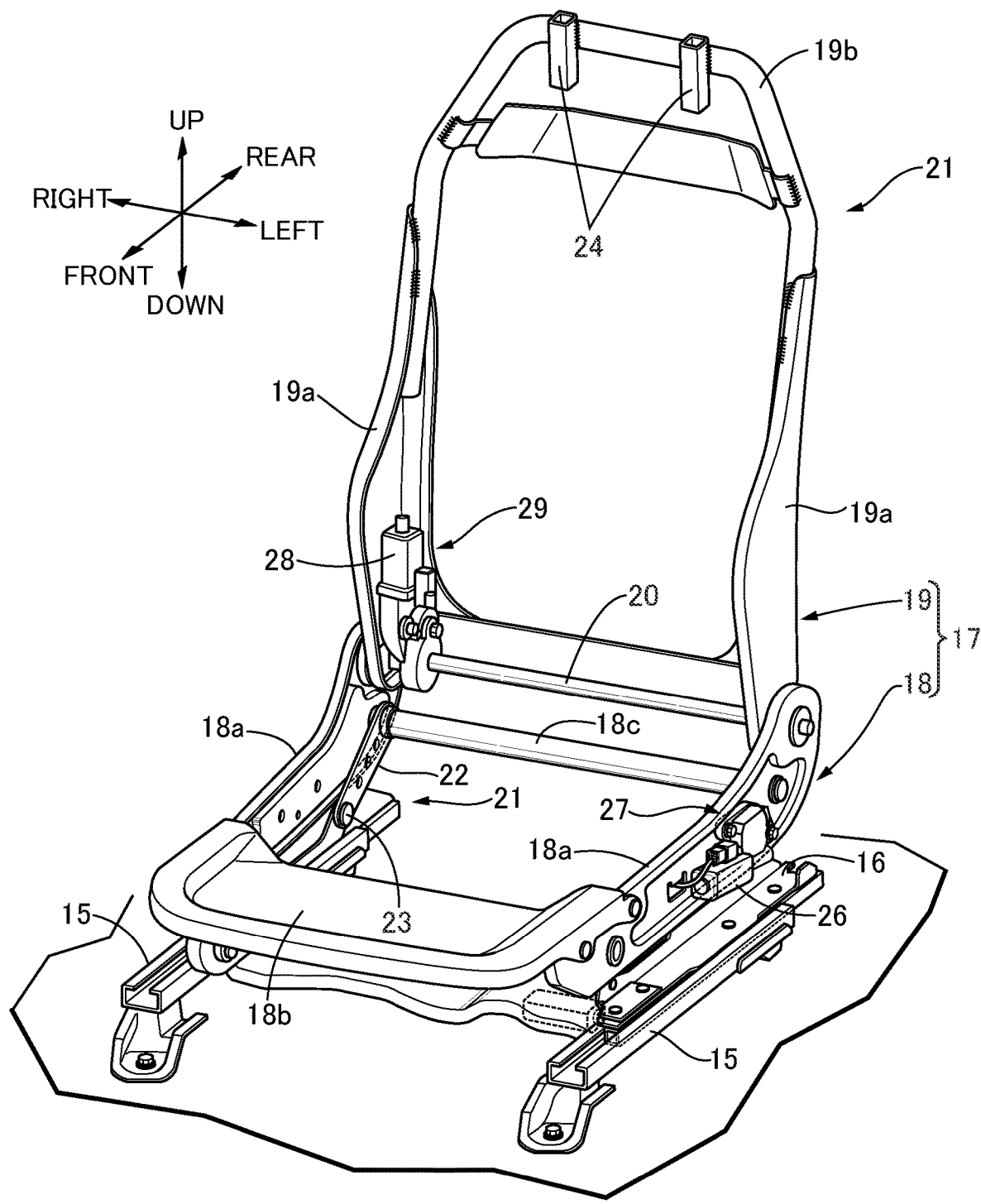
FIG. 2 is a perspective view of a seat frame. (first embodiment)

Referring in addition to FIG. 2, a seat frame 17 is disposed on a base frame 16 that can be made to slide in the vehicle fore-and-aft direction by means of a pair of left and right slide rails 15 that extend in the vehicle fore-and-aft direction and are provided on a vehicle floor face, this seat frame 17 including a seat cushion frame 18 disposed above the base frame 16 so as to support the seat cushion 12, and a seat back frame 19 linked to the seat cushion frame 18 via a support shaft 20 so as to support the seat back 13 disposed above the seat cushion 12.

The seat cushion frame 18 has a pair of left and right side frames 18a extending along the longitudinal direction of the slide rail 15, a pan frame 18b providing a link between front end parts of the side frames 18a, and a link pipe 18c providing a link between rear parts of the pair of side frames 18a.

A link mechanism 21 is provided between the base frame 16 and the seat cushion frame 18; this link mechanism 21 has a pair of left and right link members 22 having one end part pivotably linked to the link pipe 18c on the inside of the pair of left and right side frames 18a, and a linking pin 23 pivotably linking the other end part of the link members 22 to the base frame 16, the seat cushion frame 18 being linked to the base frame 16 via the link mechanism 21 so that it can be raised and lowered.

The seat back frame 19 includes a pair of left and right sheet metal frames 19a extending in the vertical direction and having their lower end parts swingably linked to a rear part of the side frame 18a via the support shaft 20, and an upper frame 19b providing a link between upper end parts of the sheet metal frames 19a, the seat back frame 19 being able to be tilted in the fore-and-aft direction around the support shaft 20. A pair of left and right pipe members 24 guiding vertical movement of the headrest 14 are fixed to the upper frame 19b.

Disposed on at least one of the seat cushion frame 18 and the seat back frame 19, in the first embodiment the seat cushion frame 18, is a cover member 25 covering part of the seat frame 17 from the side. The majority of the pair of side frames 18a of the seat cushion frame 18 of the seat frame 17 is covered by the cover member 25 from the side.

A first electric actuator 27 having a first electric motor 26 is disposed between, among the pair of left and right cover members 25, the cover member 25 facing the vehicle door side, in the first embodiment the left cover member 25, and the left side frame 18a of the seat cushion frame 18, the first electric actuator 27 being mounted on the left side frame 18a so as to exhibit a force that makes the seat frame 17 slide in the vehicle fore-and-aft direction and being covered by the cover member 25.

A second electric actuator 29 having a second electric motor 28 is mounted on the inside of a lower part of, among the pair of left and right sheet metal frames 19a of the seat back frame 19, the right sheet metal frame 19a, and the second electric actuator 29 exhibits a force that tilts the seat back frame 19 in the fore-and-aft direction around the axis of the support shaft 20.

An operation part 30 is provided on a portion, corresponding to the first electric actuator 27, of an outer face of the cover member 25, the operation part 30 operating so as to control the operation of the first electric actuator 27 and the second electric actuator 29.

Figure 3:
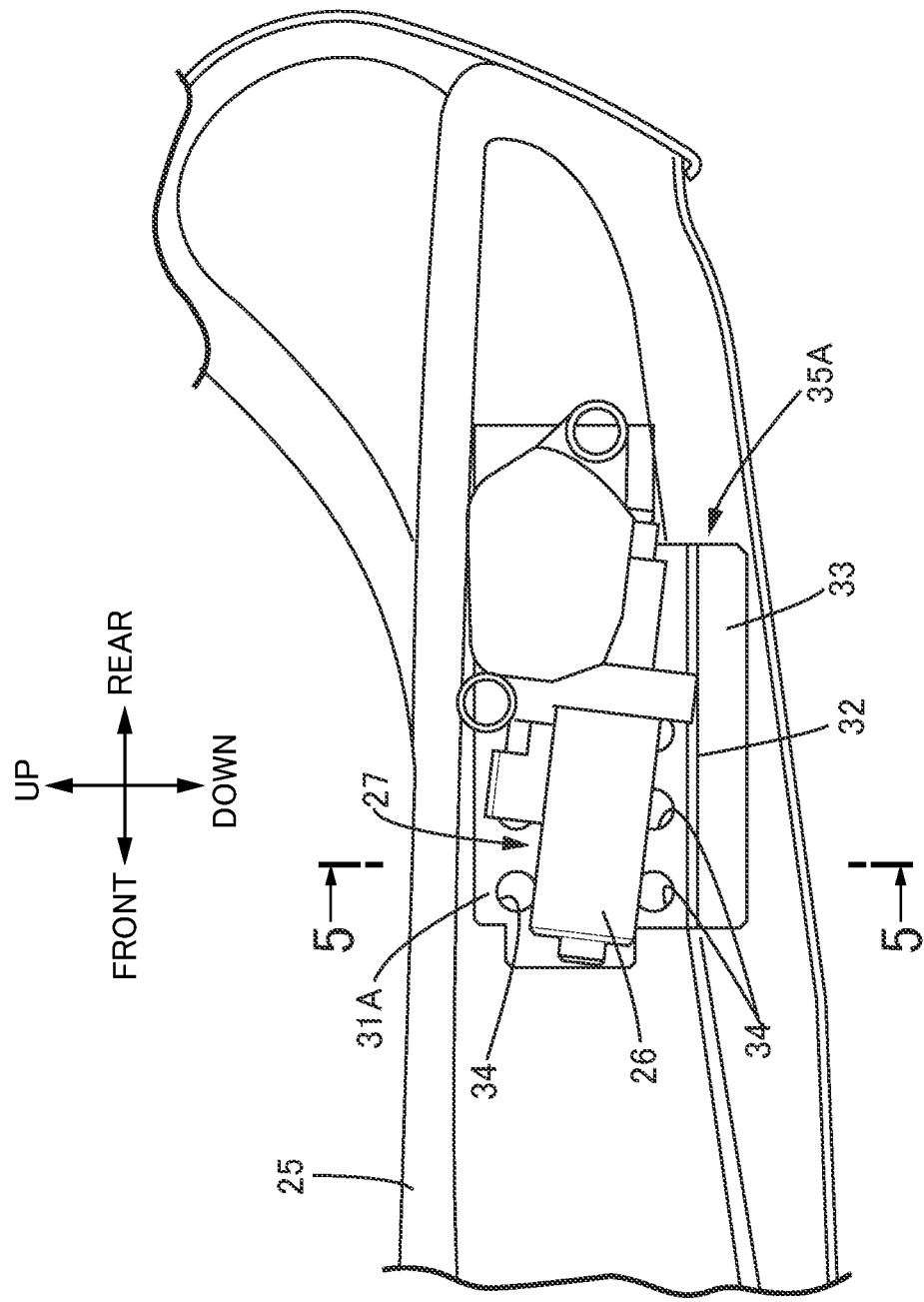
FIG. 3 is a side view when an electric actuator and a cover member having an intermediate member mounted thereon are viewed from the inside of the cover member. (first embodiment)
Figure 4:
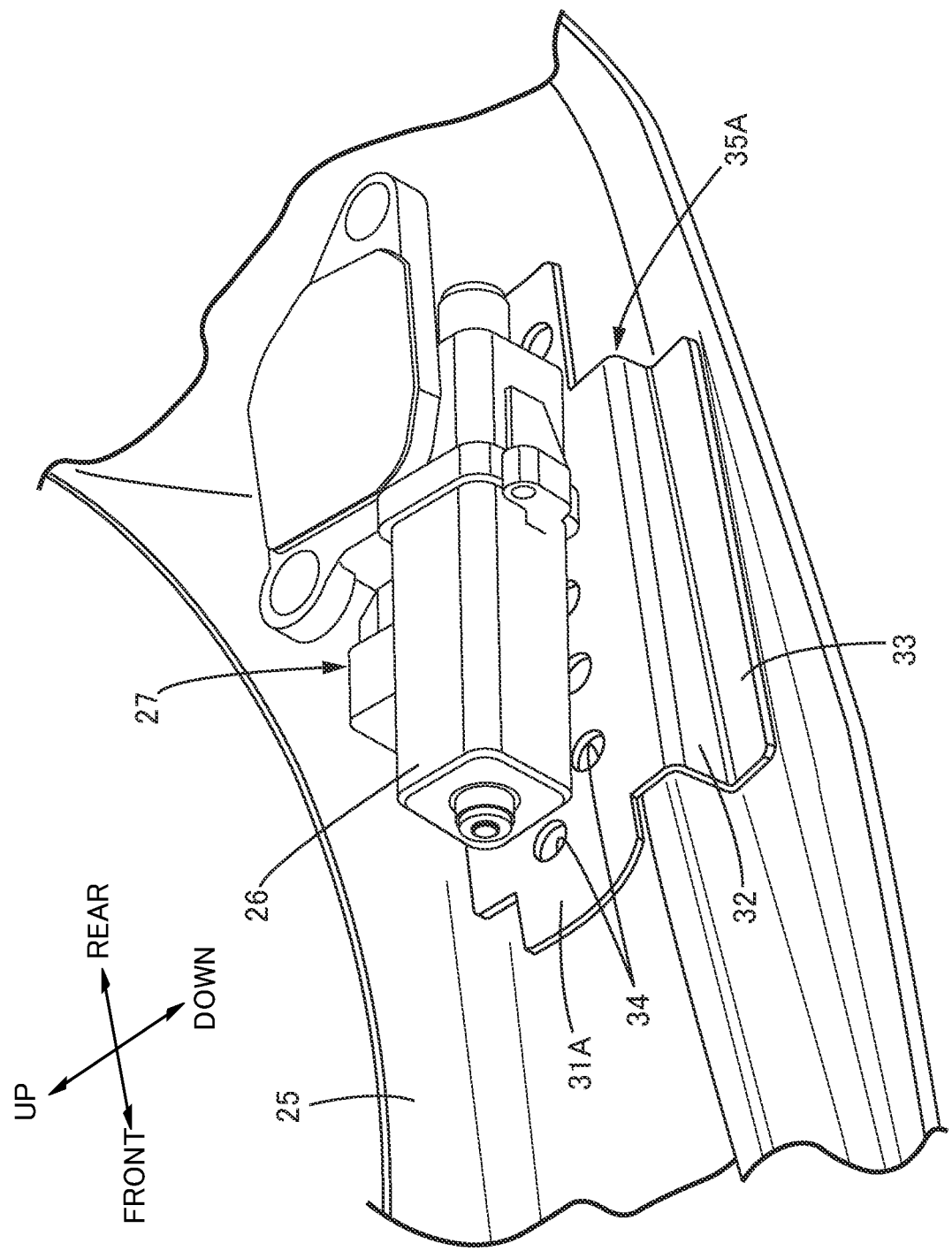
FIG. 4 is a perspective view when the electric actuator and the cover member having the intermediate member mounted thereon are viewed obliquely from the lower front inside the cover member. (first embodiment)
Figure 5:
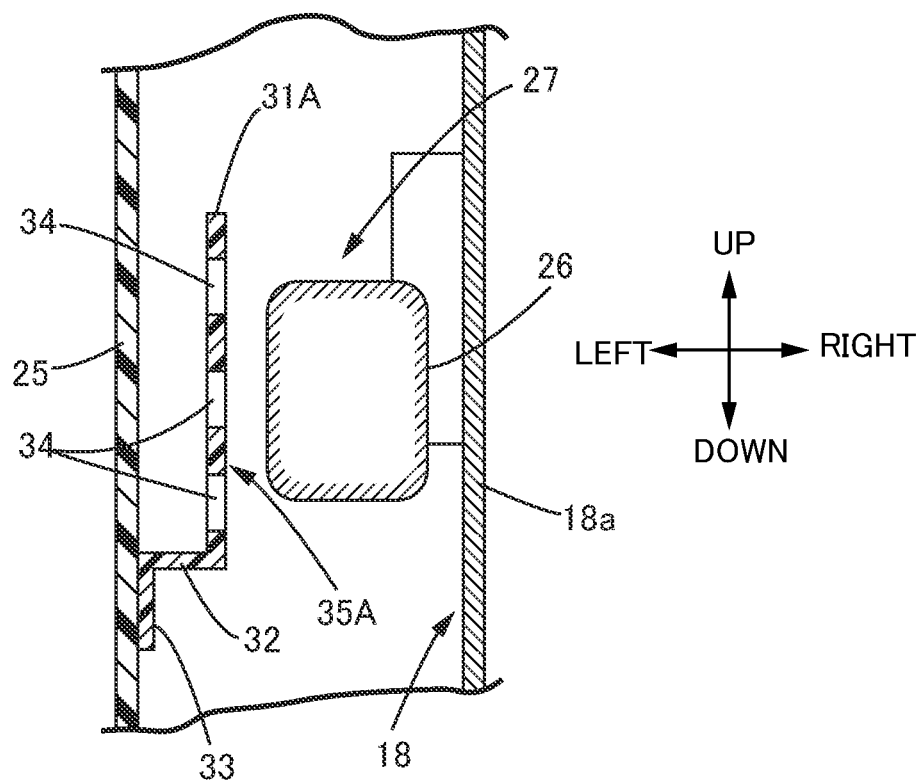
FIG. 5 is a sectional view along line 5-5 in FIG. 3. (first embodiment)

Referring in addition to FIG. 3 to FIG. 5, a plate-shaped interposing part 31A is disposed between the first electric actuator 27 as a sound generation source of the present invention and the left side frame 18a of the seat cushion frame 18 of the seat frame 17, the plate-shaped interposing part 31A opposing the side frame 18a from the outside so as to be housed within the cover member 25, a plurality of through holes 34 are bored in the plate-shaped interposing part 31A, and the hole diameter of the through hole 34 can be changed as appropriate according to a specific frequency that is required to be silenced.

The plate-shaped interposing part 31A is provided on an intermediate member 35A that is made of a resin, is a separate body from the cover member 25, and is disposed between the cover member 25 and the first electric actuator 27. Provided integrally with the intermediate member 35A are a support plate part 32 having one end part provided so as to be connected to the plate-shaped interposing part 31A and extending toward the cover member 25 side, and a mounting plate part 33 linked to the other end part of the support plate part 32. The mounting plate part 33 is fixed to the cover member 25. Fixing the mounting plate part 33 to the cover member 25 may employ adhesion using an adhesive, an interlock between a projecting part and a recess part provided on the mounting plate part 33 and the cover member 25, fixing using a clip, etc.

The operation of the first embodiment is now explained. Since the plate-shaped interposing part 31A, which is disposed between the side frame 18a of the seat cushion frame 18 of the seat frame 17 and first electric actuator 27 while opposing the left side frame 18a of the seat frame 17, is housed within the cover member 25, and the plurality of through holes 34 are bored in the plate-shaped interposing part 31A, it is possible, by utilizing effectively a portion of the cover member 25 that opposes the plate-shaped interposing part 31A having the plurality of through holes 34 and facing the cover member 25, to define a space between the cover member 25 and the plate-shaped interposing part 31A as a resonance space, and it is possible to obtain an efficient and small resonance space within the cover member 25 with a simple structure in which the plate-shaped interposing part 31A, which occupies a small space, is disposed between the cover member 25 and the first electric actuator 27, which is a sound generation source, thereby enabling sound emitted from the seat cushion frame 18 toward a person seated on the vehicle seat 11 to be suppressed.

Furthermore, since the plate-shaped interposing part 31A is provided on the intermediate member 35A, which is a separate body from the cover member 25 and is disposed between the cover member 25 and the first electric actuator 27, it is possible to facilitate machining of the intermediate member 35A having the plate-shaped interposing part 31A and enhance the degree of freedom in placement of the intermediate member 35A, and consequently the plate-shaped interposing part 31A.

Moreover, since the support plate part 32, which has one end part provided so as to be connected to the plate-shaped interposing part 31A and extends toward the cover member 25 side, and the mounting plate part 33, which is linked to the other end part of the support plate part 32, are provided on the intermediate member 35A, and the mounting plate part 33 is fixed to the cover member 25, it is possible to stably dispose the plate-shaped interposing part 31A at a position spaced from the cover member 25.

It should be noted here that the intermediate member 36A may be formed from the same type of resin material as for the cover member 25, and a modified example can be contemplated that it is formed from a rubber or a urethane. In this case, when the intermediate member 36A is made of a rubber, an effect in suppressing low frequency sound can be obtained due to its elastic properties, and when the intermediate member 36A is made of a urethane, an effect in suppressing high frequency sound due to its flexible properties can be obtained; in addition to such properties originating from the material itself an effect of the resonance space structure due to the intermediate member 36A and the cover member 25 can be obtained from synergy therewith. In addition, when as in the first embodiment the sound generation source is the first electric actuator 27 having the first electric motor 26, it is desirable that low frequency sound is suppressed by the use of a rubber intermediate member.

Second to sixth embodiments of the present invention are explained below by reference to FIG. 6 to FIG. 10; parts corresponding to those of the first embodiment are denoted by the same reference numerals and symbols and are only illustrated, detailed explanation thereof being omitted.

Second Embodiment

Figure 6:
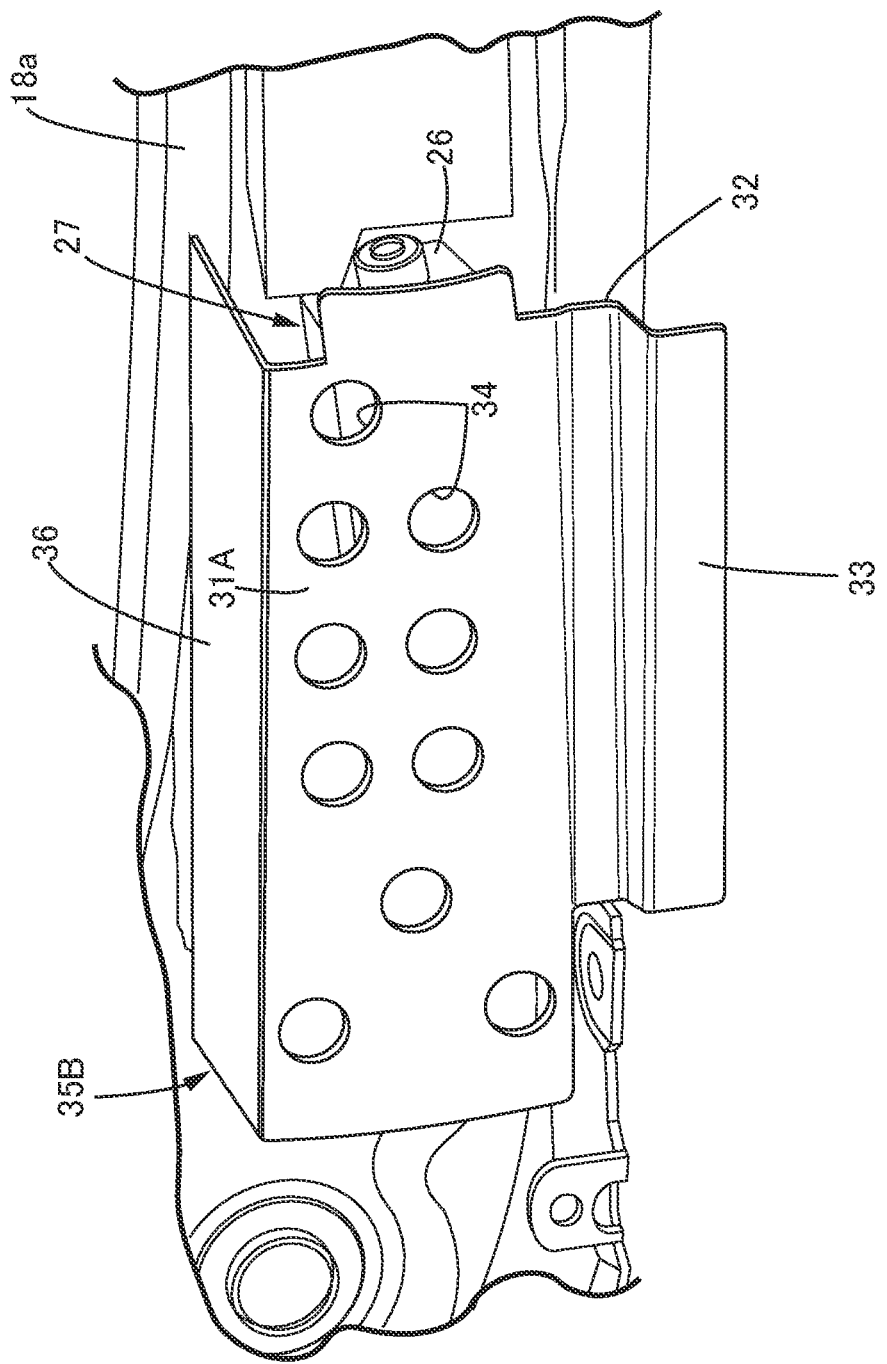
FIG. 6 is a perspective view, showing a second embodiment, of an intermediate member, an electric actuator and a side frame in a state in which a cover member is omitted when viewed from the cover member side. (second embodiment)

FIG. 6 shows a second embodiment of the present invention; an intermediate member 35B that is a separate body from the cover member 25 and is disposed between the cover member 25 and the first electric actuator 27 (see first embodiment) has a first protruding part 36 that is provided so as to be connected to the plate-shaped interposing part 31A on the side closer to a seated person with respect to the first electric actuator 27 and protrudes toward the side going away from the cover member 25, and at least part of the first electric actuator 27 that is on the side close to the seated person is covered by the first protruding part 36. In the second embodiment, the first protruding part 36 is connectedly provided integrally with an upper part of the plate-shaped interposing part 31A, and the first electric actuator 27 is covered by the first protruding part 36 from above.

In accordance with the second embodiment, the first electric motor 26 of the first electric actuator 27 radiates an operating noise in the outer peripheral direction, and with regard to radiation from the first electric actuator 27 in the direction of its outer periphery, due to the plate-shaped interposing part 31A and the first protruding part 36 of the intermediate member 35B being disposed along part of the outer periphery of the first electric actuator 27, the intermediate member 35B is disposed along the part of the outer periphery of the first electric actuator 27 over the range of a portion, facing the plate-shaped interposing part 31A side, of the first electric actuator 27, and it is possible to efficiently silence sound generated by the first electric actuator 27. Moreover, due to the side, close to a seated person, of the first electric actuator 27 being covered by the first protruding part 36, it is possible to silence effectively sound generated from the first electric actuator 27 and transmitted to the seated person side. In particular, when as in the second embodiment the first electric motor 26 is disposed in an attitude substantially following the vehicle fore-and-aft direction, operating noise radiated from the first electric motor 26 has a tendency for the upper side to be stronger depending on the rotational direction of the first electric motor 26, and it is possible for the first protruding part 36 to suppress such an operating noise reaching the seated person side.

Third Embodiment

Figure 7:
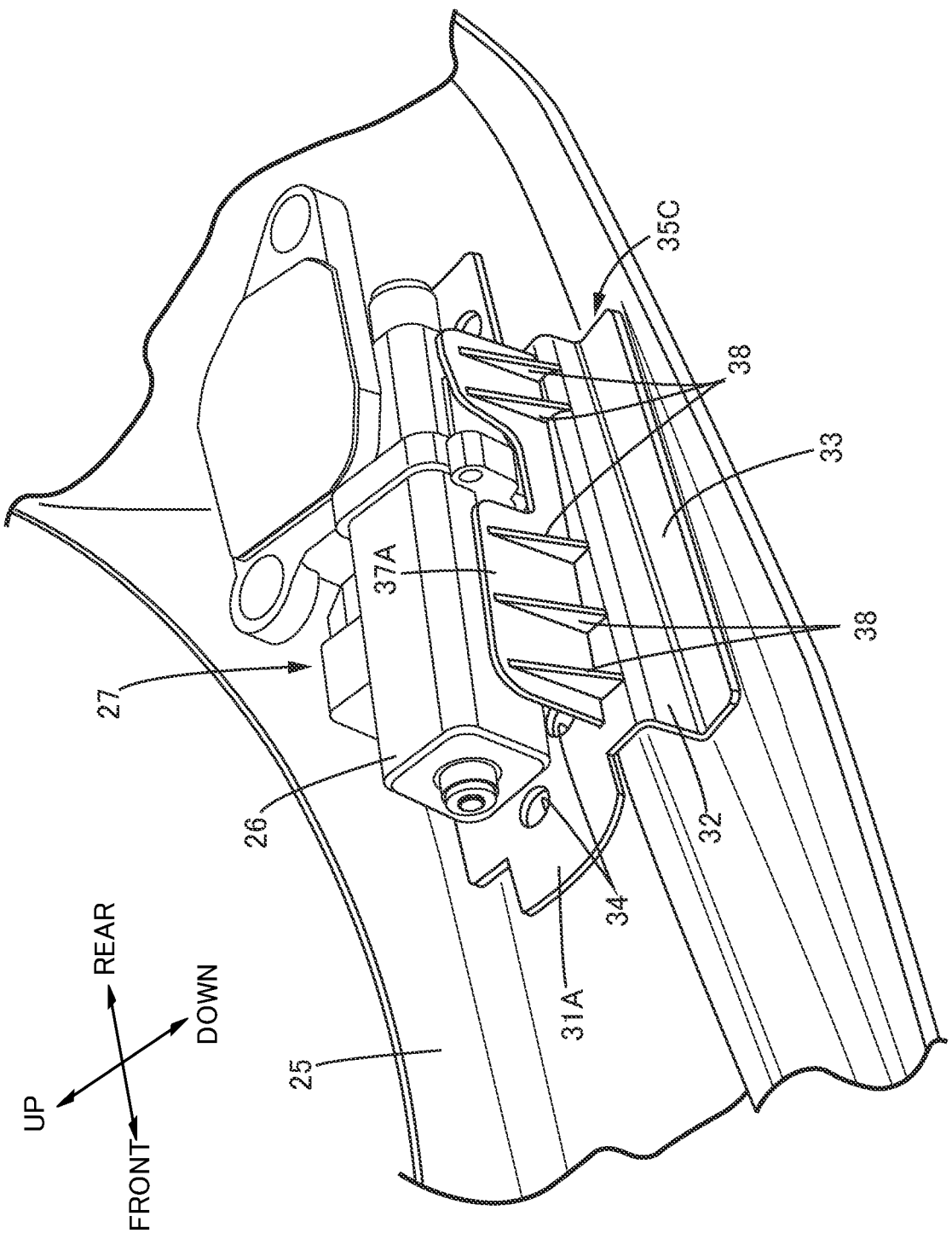
FIG. 7 is a perspective view, corresponding to FIG. 4, of a third embodiment. (third embodiment)

FIG. 7 shows a third embodiment of the present invention; an intermediate member 35C that is a separate body from the cover member 25 and is disposed between the cover member 25 and the first electric actuator 27 (see first embodiment) has a second protruding part 37A that is provided so as to be connected to the plate-shaped interposing part 31A on the side farther from a seated person with respect to the first electric actuator 27 and protrudes toward the side going away from the cover member 25, at least part of the first electric actuator 27 that is on the side far from the seated person being covered by the second protruding part 37A. In the third embodiment, the second protruding part 37A is connectedly provided integrally with a lower part of the plate-shaped interposing part 31A, and the first electric actuator 27 is covered by the second protruding part 37A from beneath.

Moreover, the second protruding part 37A is provided so as to be connected to the plate-shaped interposing part 31A between the first electric actuator 27 and the support plate part 32, and a reinforcing part 38 linked to the plate-shaped interposing part 31A is provided at a plurality of locations on a side face, on the side opposite to the first electric actuator 27, of the second protruding part 37A.

In accordance with the third embodiment, the first electric motor 26 of the first electric actuator 27 radiates operating noise in the outer peripheral direction, and with regard to radiation from the first electric actuator 27 in the direction of its outer periphery, due to the plate-shaped interposing part 31A and the second protruding part 37A of the intermediate member 35C being disposed along part of the outer periphery of the first electric actuator 27 over the range of a portion, facing the plate-shaped interposing part 31A side, of the first electric actuator 27, it is possible to efficiently silence sound generated by the first electric actuator 27 and, in particular, since at least part of the first electric actuator 27 that is on the side far from the seated person is covered by the second protruding part 37A provided so as to be connected to the plate-shaped interposing part 31A on the side farther from the seated person with respect to the first electric actuator 27, it is possible to silence effectively sound generated from the first electric actuator 27 on the side far from the seated person.

Furthermore, in the third embodiment, the first electric actuator 27 as a sound generation source is mounted on the left side frame 18a of the seat cushion frame 18 of the seat frame 17, and when the sound generation source is disposed on the seat back frame 18 of the seat frame 17 of a front seat, due to at least the side, far from the seated person, of the sound generation source being covered by the second protruding part provided so as to be connected to the plate-shaped interposing part on the side farther from the seated person with respect to the sound generation source, it is possible to silence sound radiated toward a person seated on a rear seat.

Moreover, the strength of the plate-shaped interposing part 31A can be enhanced by the reinforcing part 38 provided on the side face, on the side opposite to the first electric actuator 27, of the second protruding part 37A and, in particular, at the time of an external force being inputted such as at the time of a vehicle side collision the cover member 25 can be reinforced by the plate-shaped interposing part 31A.

Fourth Embodiment

Figure 8:
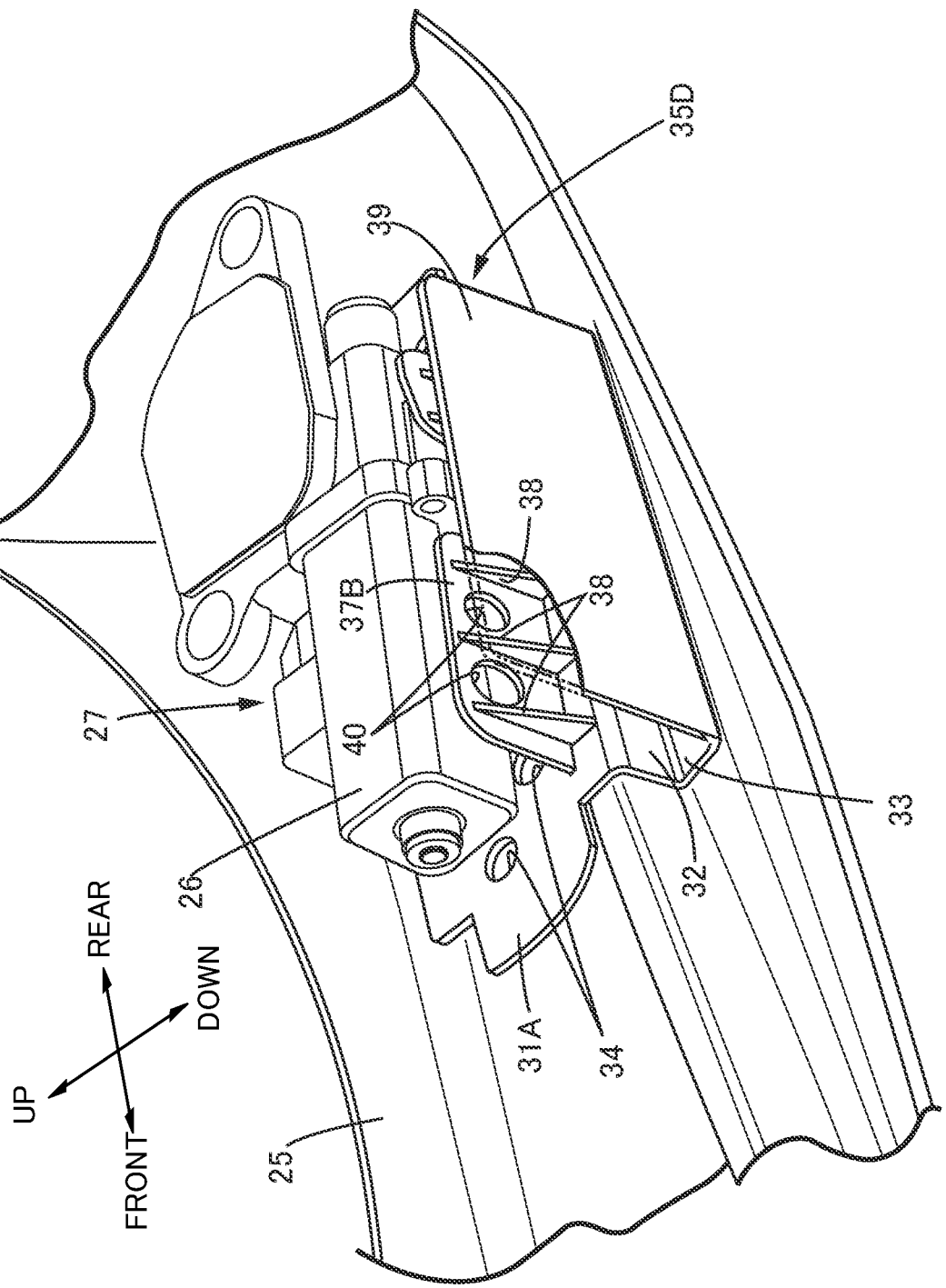
FIG. 8 is a perspective view, corresponding to FIG. 4, of a fourth embodiment. (fourth embodiment)

FIG. 8 shows a fourth embodiment of the present invention. An intermediate member 35D that is a separate body from the cover member 25 and is disposed between the cover member 25 and the first electric actuator 27 (see first embodiment) has a second protruding part 37B that is provided so as to be connected to a lower part of the plate-shaped interposing part 31A, protrudes toward the side going away from the cover member 25, covers the first electric actuator 27 from beneath, and is reinforced by the reinforcing part 38, and has a cover part 39 that covers the second protruding part 37B from the side opposite to the first electric actuator 27, the cover part 39 being connectedly provided at the extremity of the mounting plate part 33. Moreover, the second protruding part 37B is provided with a plurality of second through holes 40 whose diameter can be changed as appropriate depending on a specific frequency of sound that is desired to be silenced.

In accordance with the fourth embodiment, a resonance space that is completed only by the intermediate member 35D can be formed between the second protruding part 37B and the cover part 49.

Fifth Embodiment

Figure 9:
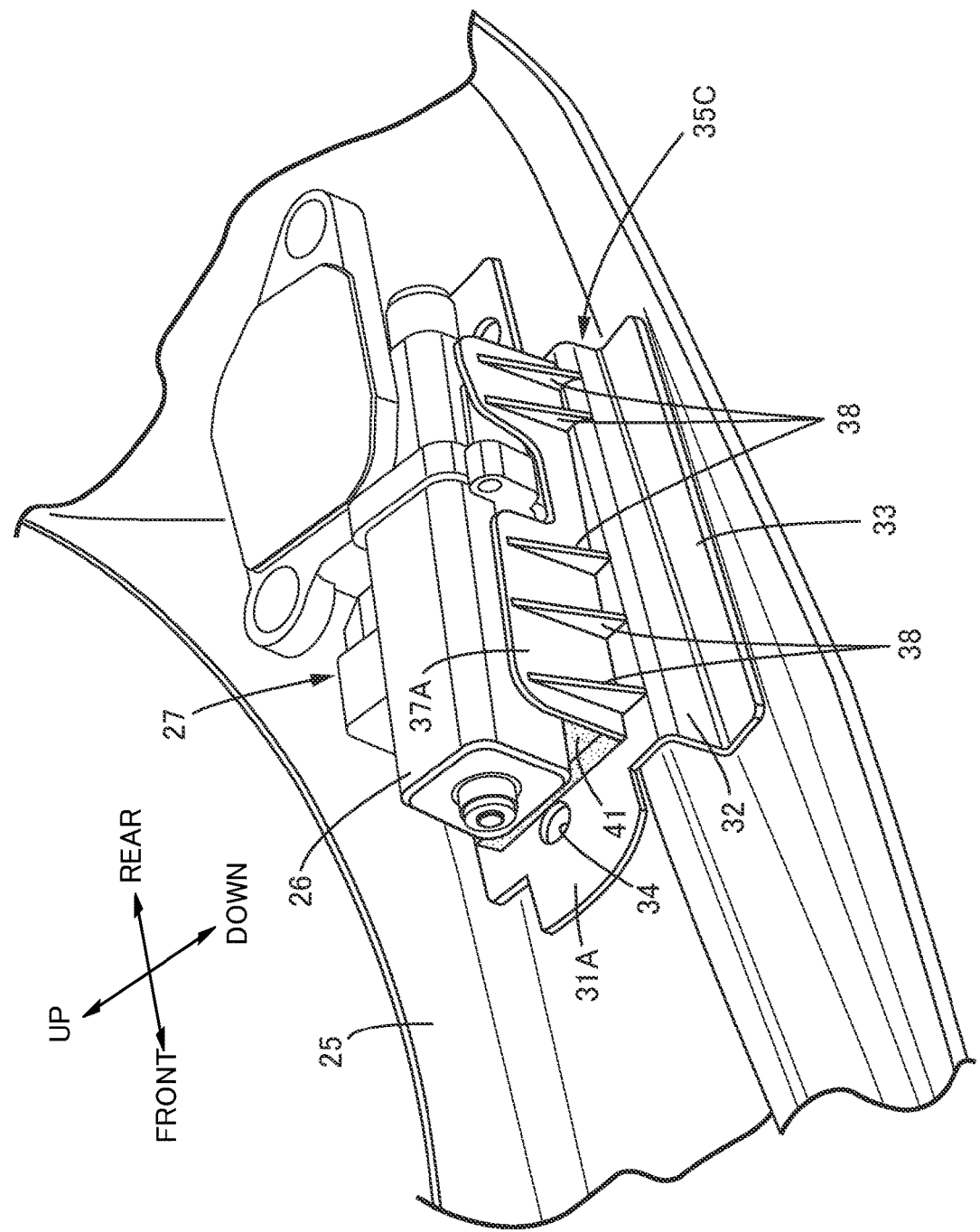
FIG. 9 is a perspective view, corresponding to FIG. 4, of a fifth embodiment. (fifth embodiment)

FIG. 9 shows a fifth embodiment of the present invention; a urethane pad 41 is disposed between the first electric actuator 27 or cover member 25 and the plate-shaped interposing part 31A of the intermediate member 35C, which is a separate body from the cover member 25 and is disposed between the cover member 25 and the first electric actuator 27 (see first embodiment), and in this fifth embodiment the urethane pad 41 is disposed between the first electric actuator 27 and the plate-shaped interposing part 31A of the intermediate member 35C.

In accordance with the fifth embodiment, in addition to the silencing effect due to the resonance space an effect in absorbing sound due to the urethane pad 41 can also be obtained.

Sixth Embodiment

Figure 10:
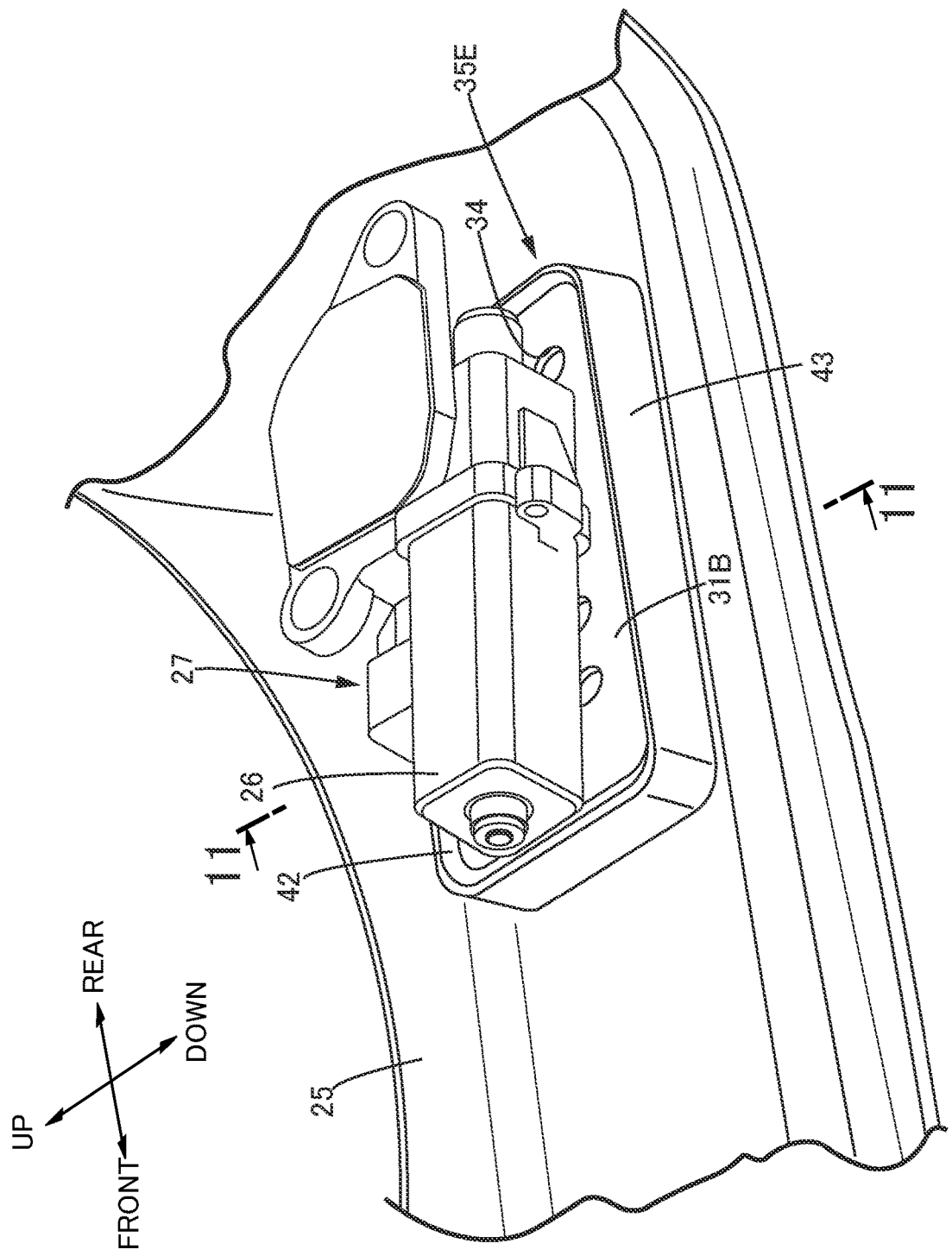
FIG. 10 is a perspective view, corresponding to FIG. 4, of a sixth embodiment. (sixth embodiment)
Figure 11:
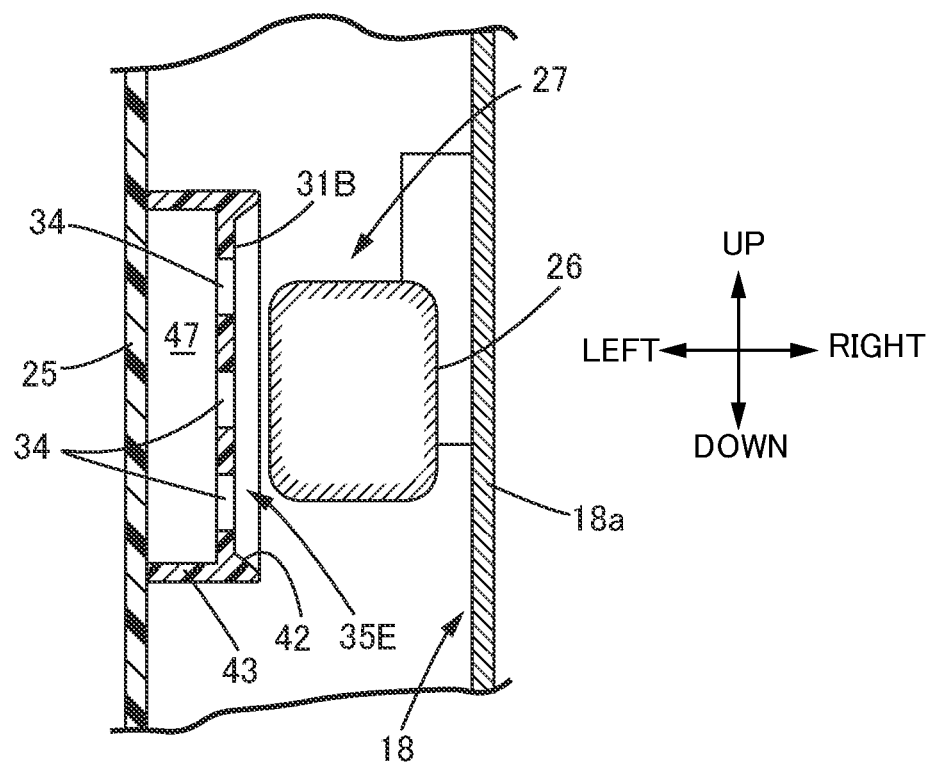
FIG. 11 is a sectional view along line 11-11 in FIG. 10. (sixth embodiment)

FIG. 10 and FIG. 11 show a sixth embodiment of the present invention. A plate-shaped interposing part 31B that opposes the left side frame 18a (see first embodiment) from the outside so as to be housed within the cover member 25 is disposed between the first electric actuator 27 (see first embodiment) and the side frame 18a, and the plurality of through holes 34 are bored in the plate-shaped interposing part 31B.

The plate-shaped interposing part 31B is provided on a resin intermediate member 35E that is a separate body from the cover member 25 and is disposed between the cover member 25 and the first electric actuator 27. Provided on the intermediate member 35E are a side wall part 42 that has one end part provided so as to be connected to the entire peripheral edge of the plate-shaped interposing part 31B, which has a rectangular shape, and extends slightly toward the first electric actuator 27 side while being inclined, and a rectangular tubular support wall part 43 that has one end part linked to the entire periphery of the other end part of the side wall part 42 and extends toward the cover member 25. The entire periphery of the other end part of the support wall part 43 is fixed by adhesion, etc. to the cover member 25 so as to form a sealed closed space 47 between the plate-shaped interposing part 31B and the cover member 25.

The first electric actuator 27 radiates sound in the direction of its outer periphery, and in a state in which the support wall part 43 is fixed to the cover member 25 the plate-shaped interposing part 31B and the side wall part 42 are disposed along part of the outer periphery of the first electric actuator 27.

In accordance with the sixth embodiment, with regard to radiation from the first electric actuator 27 in the direction of its outer periphery, due to the intermediate member 35E being disposed along part of the outer periphery of the first electric actuator 27 over the range of a portion, facing the plate-shaped interposing part 31B side, of the first electric actuator 27, it is possible to efficiently silence the sound generated by the first electric actuator 27.

Seventh Embodiment

Figure 12:
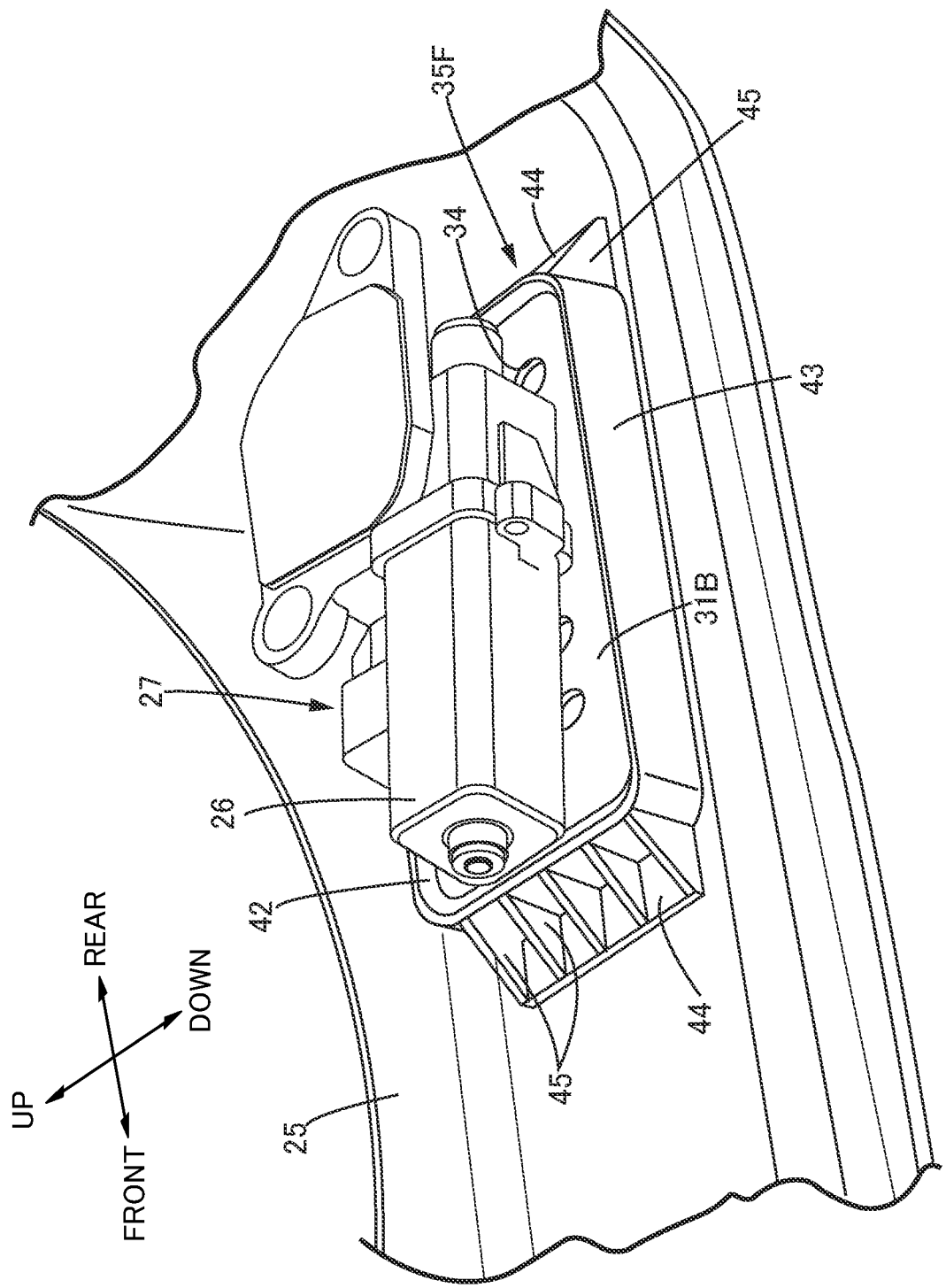
FIG. 12 is a perspective view, corresponding to FIG. 4, of a seventh embodiment. (seventh embodiment)

FIG. 12 shows a seventh embodiment of the present invention. The plate-shaped interposing part 31B, which opposes the left side frame 18a (see first embodiment) from the outside so as to be housed within the cover member 25, is disposed between the first electric actuator 27 (see first embodiment) and the side frame 18a, and the plurality of through holes 34 are bored in the plate-shaped interposing part 31B.

The plate-shaped interposing part 31B is provided on a resin intermediate member 35F that is a separate body from the cover member 25 and is provided between the cover member 25 and the first electric actuator 27. The intermediate member 35F is provided with the side wall part 42, which has one end part provided so as to be connected to the entire peripheral edge of the rectangular plate-shaped interposing part 31B and extends slightly toward the first electric actuator 27 side while being inclined, the rectangular tubular support wall part 43, which has one end part linked to the entire periphery of the other end part of the side wall part 42 and extends toward the cover member 25, a mounting plate part 44 that is linked to the other end part of the support wall part 43 via front and rear end parts of the intermediate member 35F, and a plurality of reinforcing parts 45 provided between the support wall part 43 and the mounting plate part 44. The mounting plate part 44 is fixed to the cover member 25.

In accordance with the seventh embodiment, the same effects as in the sixth embodiment can be exhibited and, moreover, the strength with which the intermediate member 35F is fixed to the cover member 25 can be enhanced.

Eighth Embodiment

An eighth embodiment of the present invention is explained by reference to FIG. 13 to FIG. 15; parts corresponding to those of the first to seventh embodiments are denoted by the same reference numerals and symbols and are only illustrated, detailed explanation thereof being omitted.

Figure 13:
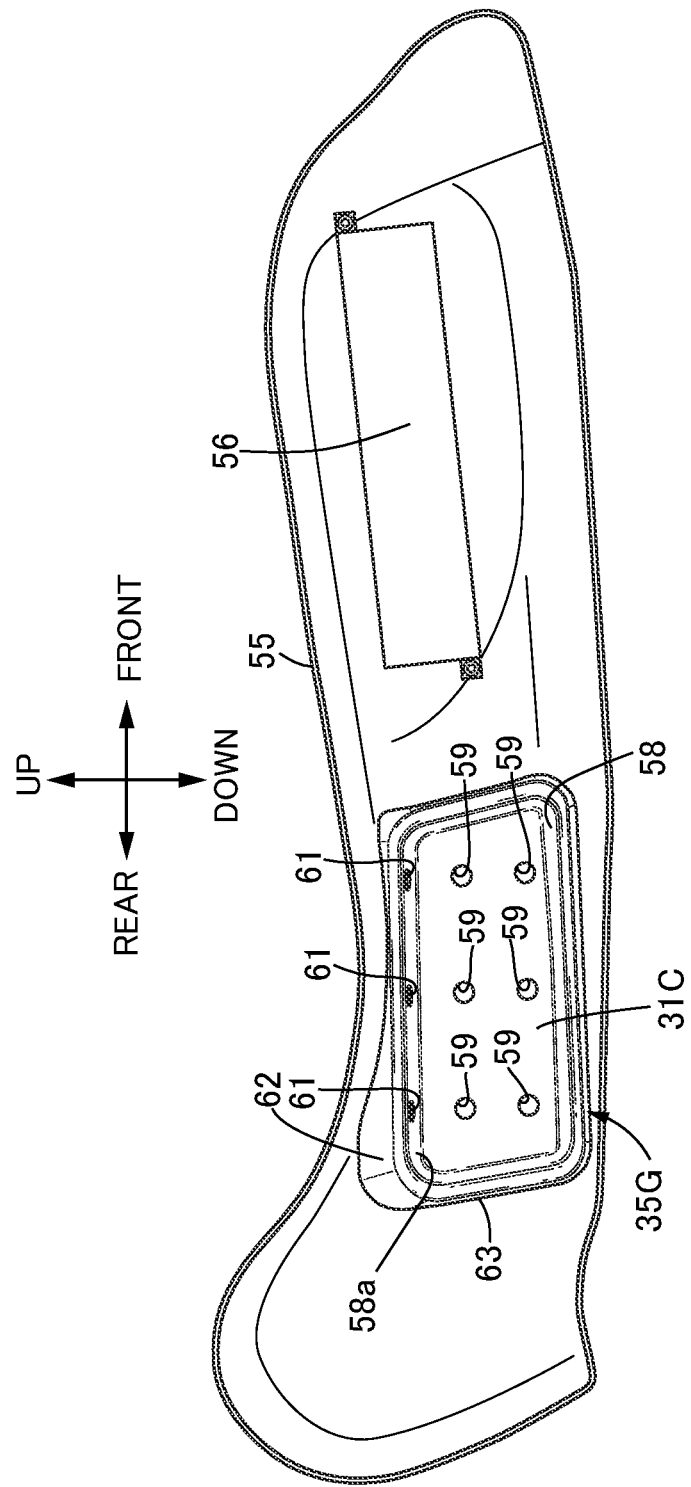
FIG. 13 is a side view of a cover member of an eighth embodiment when viewed from a side frame side. (eighth embodiment)

First, in FIG. 13, the first electric actuator 27 (see FIG. 15) having the first electric motor 26 (see FIG. 15) is disposed between a left cover member 55 and the left side frame 18a, a plate-shaped interposing part 31C opposing the left side frame 18a from the outside so as to be housed within the cover member 55 is disposed between the first electric actuator 27 and the side frame 18a, a plurality of through holes 59 are bored in the plate-shaped interposing part 31C, and the hole diameter of the through holes 59 can be changed as appropriate according to a specific frequency of sound that is desired to be silenced.

Figure 14:
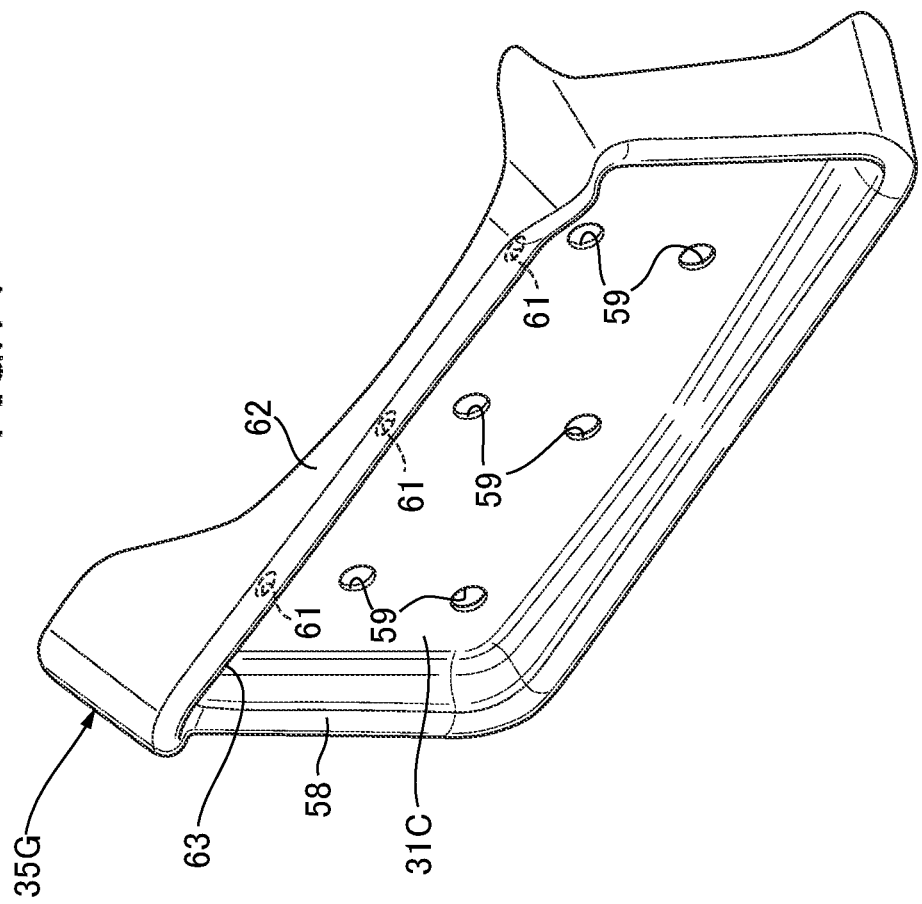
FIG. 14 is a perspective view of an intermediate member. (eighth embodiment)
Figure 15:
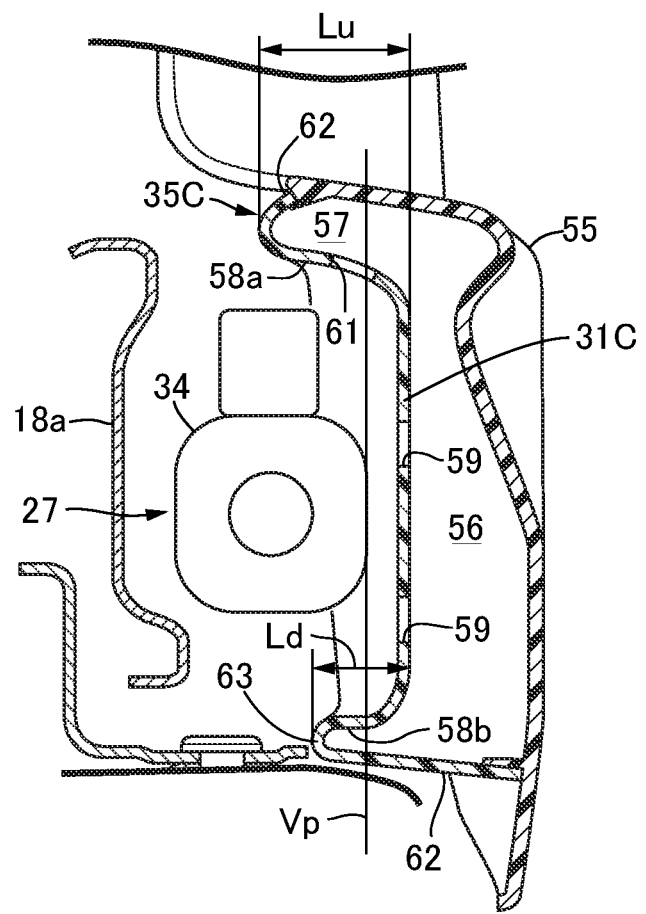
FIG. 15 is a vertical sectional view showing the side frame and the cover member in the vicinity of a first electric actuator. (eighth embodiment)

Referring in addition to FIG. 14 and FIG. 15, the plate-shaped interposing part 31C is provided on a resin intermediate member 35G that is a separate body from the cover member 55 and is disposed between the cover member 55 and the first electric actuator 27, and the intermediate member 35G integrally has the plate-shaped interposing part 31C, which opposes the first electric actuator 27 while forming a space (first space) 56 between itself and the left cover member 55, a side wall part 58 that has one end part provided so as to be connected to the entire peripheral edge of the plate-shaped interposing part 31C and extends toward the first electric actuator 27 side, a fold-back part 63 that is provided on the entire periphery of the other end part of the side wall part 58, and a support wall part 62 that extends from the fold-back part 63 toward the cover member 55 side.

A space (second space) 57 communicating with the space 56 is formed between an upper wall portion 58a of the side wall part 58 and the cover member 55; the space 57 between the upper wall portion 58a and the cover member 55 forms a resonance space together with the space 56 between the plate-shaped interposing part 31C and the cover member 55, and a plurality of through holes 61 are formed in the upper wall portion 58a.

The upper wall portion 58a of the side wall part 58 is disposed above the first electric motor 26 of the first electric actuator 27, and a lower wall portion 58b of the side wall part 58 is disposed beneath the first electric motor 26. The upper wall portion 58a and the lower wall portion 58b extend from the plate-shaped interposing part 31C so as to approach the side frame 18a beyond a virtual vertical plane Vp that comes into contact with the first electric motor 26 from the plate-shaped interposing part 31C side. Moreover, a horizontal length Lu of the upper wall portion 58a is greater than a horizontal length Ld of the lower wall portion 58b, and an end part, on the fold-back part 63 side, of the upper wall portion 58a is present at a position farther from the virtual vertical plane Vp than an end part, on the fold-back part 63 side, of the lower wall portion 58b.

An edge of the support wall part 62 is fixed to the cover member 55 via the entire periphery without a gap. However, the edge of the support wall part 62 may be at least in contact with the cover member 55 via the entire periphery without a gap, and the fold-back part 63 and the support wall part 62 block a space sandwiched between the cover member 55 and the intermediate member 35G, thereby defining a resonance space.

A control unit 56 controlling the operation of the first electric actuator 27 is fixed to an inner face of the cover member 55 further forward than the intermediate member 35G in the vehicle fore-and-aft direction.

In accordance with the eighth embodiment, sound transmitted from the first electric actuator 27 in the horizontal direction is shielded by the plate-shaped interposing part 31C, and sound leaking through the through hole 59 to the space 56 resonates within the space 56, thus enabling the leakage of sound to be prevented.

Sound transmitted from the first electric actuator 27 in the vertical direction is shielded by the upper wall portion 58a of the side wall part 58. Sound leaking through the through hole 61 to the space 57 resonates within the space 57, thus enabling the leakage of sound to be prevented. In this way, not only can leakage of sound in the horizontal direction be prevented, but it is also possible to prevent the leakage of sound in the vertical direction, and an occupant seated on the vehicle seat 11 can be free from noise generated from the first electric actuator 27. Since sound transmitted upward from the first electric actuator 27 is shielded by the upper wall portion 58a, an occupant seated on the seat cushion 12 can experience quietness despite the sound generated from the first electric actuator 27.

Moreover, the horizontal length Lu of the upper wall portion 58a, positioned above the first electric motor 26, of the side wall part 58 of the intermediate member 35G is larger than the horizontal length Ld of the lower wall portion 58b positioned beneath the first electric motor 26. Because of this, the sound transmitted upward from the first electric motor 26 is shielded by the upper wall portion 58a, the sound transmitted downward from the first electric motor 26 is shielded by the lower wall portion 58b, and the generation of sound reflected from below and transmitted upward can be prevented. Because of this, an occupant seated on the seat cushion 12 can experience quietness despite the sound generated from the first electric motor 26.

Furthermore, since the end part, on the fold-back part 63 side, of the upper wall portion 58a is present at a position farther from the virtual vertical plane Vp than the end part, on the fold-back part 63 side, of the lower wall portion 58b, sound transmitted upward from the first electric motor 26 is shielded by the upper wall portion 58a, and sound transmitted downward from the first electric motor 26 is shielded by the lower wall portion 58b. The generation of sound reflected from below and transmitted upward can be prevented, and an occupant seated on the seat cushion 12 can experience quietness despite the sound generated from the first electric motor 26.

Moreover, the intermediate member 35D has the support wall part 62, which is linked to the side wall part 58 of the plate-shaped interposing part 31C via the fold-back part 63 and extends toward the side going away from the fold-back part 63, and the stiffness of the side wall part 58 can be enhanced by the function of the fold-back part 63 and the support wall part 62. Furthermore, since the support wall part 62 is formed as a continuous body without a hole, sound leaking through the through hole 61 to the space 57 is shielded by the support wall part 62, sound transmitted upward from the first electric motor 26 is efficiently reduced, and an occupant seated on the seat cushion 12 can experience quietness despite the sound generated from the first electric motor 26.

Moreover, since the support wall part 62 is in contact with the cover member 55 without a gap, and the space 57 formed between the upper wall portion 58a and the cover member 55 is blocked, sound transmitted upward from the first electric motor 26 is efficiently reduced, and an occupant seated on the seat cushion 12 can experience quietness despite the sound generated from the first electric motor 26.

Furthermore, the edge of the support wall part 62 is fixed to the cover member 55 without a gap, the space 57 formed between the upper wall portion 58a and the cover member 55 is thereby blocked, and sound transmitted upward from the first electric motor 26 is efficiently reduced. An occupant seated on the seat cushion 12 can thereby experience quietness despite the sound generated from the first electric motor 26.

Ninth Embodiment

Figure 16:
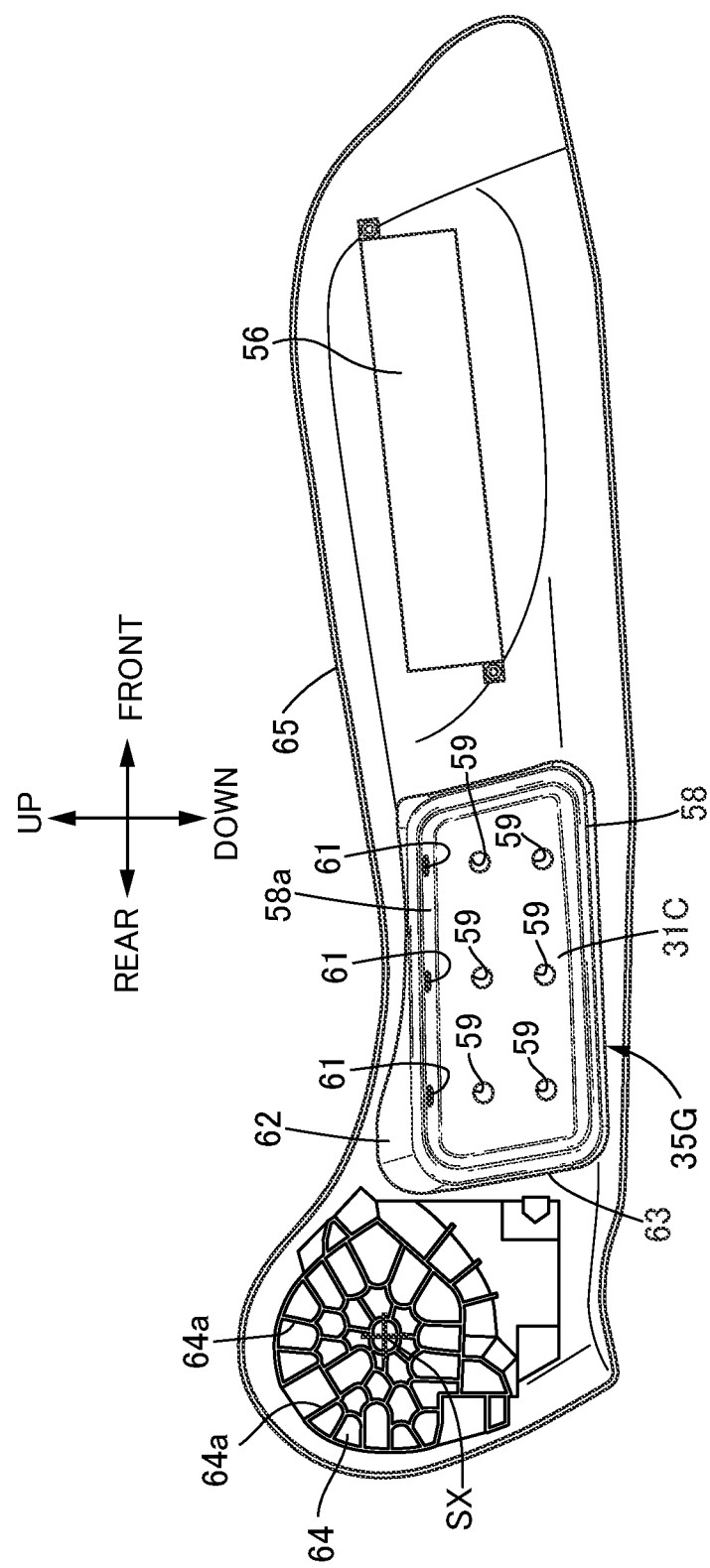
FIG. 16 is a side view, corresponding to FIG. 13, of a ninth embodiment. (ninth embodiment)

A ninth embodiment of the present invention is explained by reference to FIG. 16; parts corresponding to those of the eighth embodiment are denoted by the same reference numerals and symbols and are only illustrated, detailed explanation thereof being omitted.

The intermediate member 35G, which has the plate-shaped interposing part 31C opposing the left side frame 18a (see eighth embodiment) from the outside so as to be housed within a cover member 65 and having the plurality of through holes 59 bored therein, is disposed between the first electric actuator 27 (see eighth embodiment) and the side frame 18a, and the intermediate member 35G is fixed to the cover member 65 as in the eighth embodiment. The control unit 56, which controls the operation of the first electric actuator 27, is fixed to an inner face of the cover member 65 further forward than the intermediate member 35G in the vehicle fore-and-aft direction.

A load transmission member 64 is fixed to the inner face of the cover member 65 at a position deviating from the plate-shaped interposing part 31C in the vehicle fore-and-aft direction. The load transmission member 64 is disposed on the inner side of the cover member 65 on an extension line of a swing axis SX of the seat back 13 (see FIG. 1 of first embodiment), and is sandwiched between the left side frame 18a and the cover member 65 on an extension line of the support shaft 20 (see FIG. 2 of first embodiment).

The load transmission member 64 includes a wall 64a that spreads in parallel with the swing axis SX and is disposed as a net, and the wall 64a partitions the interior of the load transmission member 64 into a plurality of small chambers. The load transmission member 64 is molded from a high strength resin material, and the stiffness of the load transmission member 64 can be enhanced in the axial direction of the swing axis SX by function of the wall 64a.

The load transmission member 64 exhibits a function of transmitting, to the left side frame 18a, a collision load acting on the cover member 65 on the left side from the side of the vehicle seat 11. Since the side frame 18a is linked to a floor panel of the vehicle body through the slide rail 13, a collision load from the side is supported by a rigid structure formed from the floor panel, the two side frames 18a, and the support shaft 20, and the stiffness of the floor panel can be enhanced by the function of the support shaft 20.

Tenth Embodiment

Figure 17:
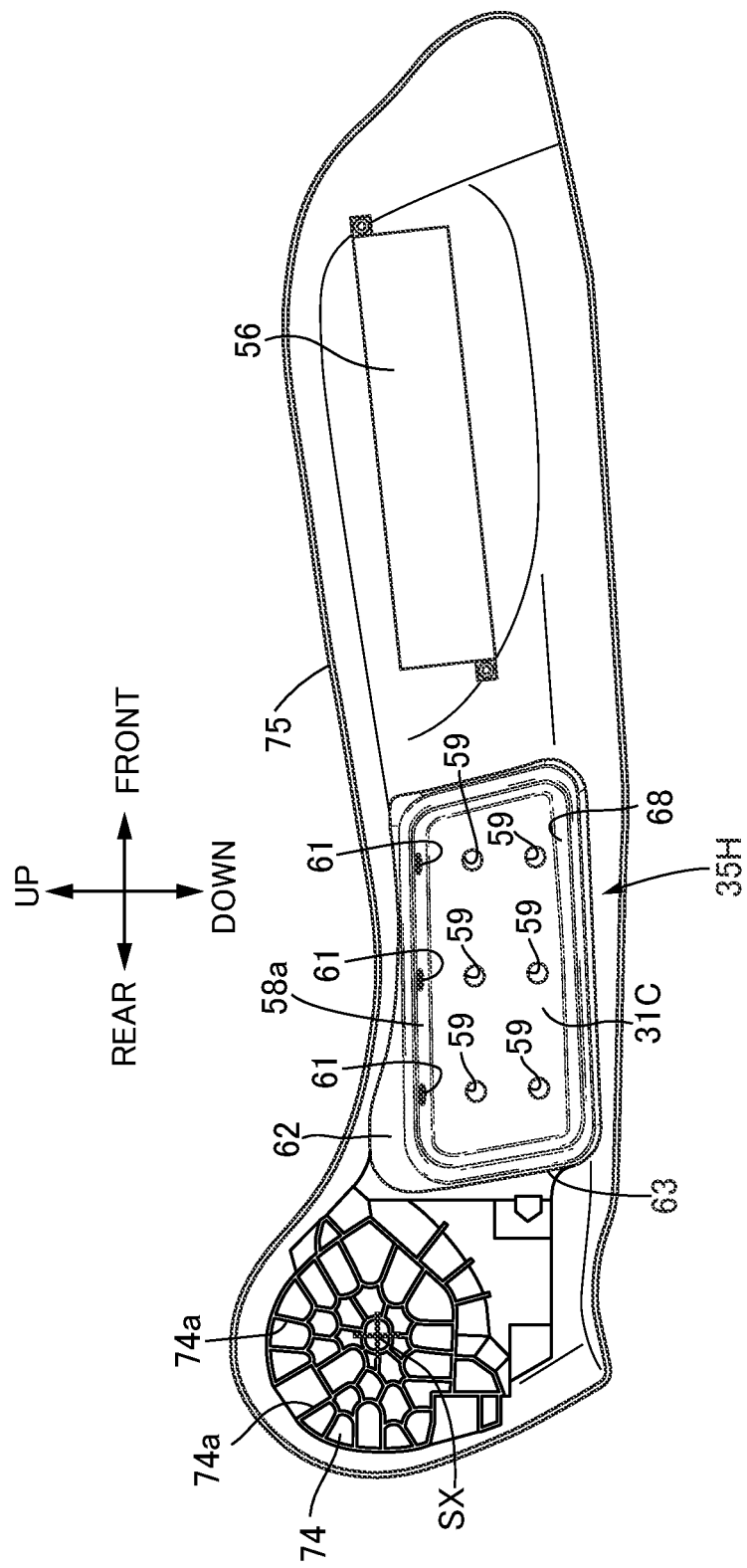
FIG. 17 is a side view, corresponding to FIG. 13, of a tenth embodiment. (tenth embodiment)

A tenth embodiment of the present invention is explained by reference to FIG. 17; parts corresponding to those of the ninth embodiment are denoted by the same reference numerals and symbols and are only illustrated, detailed explanation thereof being omitted.

An intermediate member 35H that has the plate-shaped interposing part 31C opposing the left side frame 18a (see eighth embodiment) from the outside so as to be housed within a cover member 75 and having the plurality of through holes 59 bored therein is disposed between the first electric actuator 27 (see eighth embodiment) and the side frame 18a, and the intermediate member 35H is fixed to the cover member 75 as in the eighth and ninth embodiments. The control unit 56, which controls the operation of the first electric actuator 27, is fixed to an inner face of the cover member 75 further forward than the intermediate member 35H in the vehicle fore-and-aft direction.

A load transmission member 74 is fixed to the inner face of the cover member 75 at a position deviating from the plate-shaped interposing part 31C in the vehicle fore-and-aft direction. The load transmission member 74 is disposed on the inner side of the cover member 75 on an extension line of the swing axis SX of the seat back 13 (see FIG. 1 of first embodiment), and is sandwiched between the left side frame 18a and the cover member 75 on an extension line of the support shaft 20 (see FIG. 2 of first embodiment).

As in the ninth embodiment, the load transmission member 74 is formed so as to have a wall 74a that spreads in parallel with the swing axis SX of the seat back 13 and is disposed as a net, and is continuous from the intermediate member 35H. That is, the load transmission member 74 is integrated with the intermediate member 35H. The intermediate member 35H and the load transmission member 74 are molded as one member from a high strength resin material, and the stiffness of the load transmission member 74 is enhanced in the axial direction of the swing axis SX by function of the wall 74a.

In accordance with the tenth embodiment also, the same effects as those of the ninth embodiment can be exhibited.

Eleventh Embodiment

Figure 18:
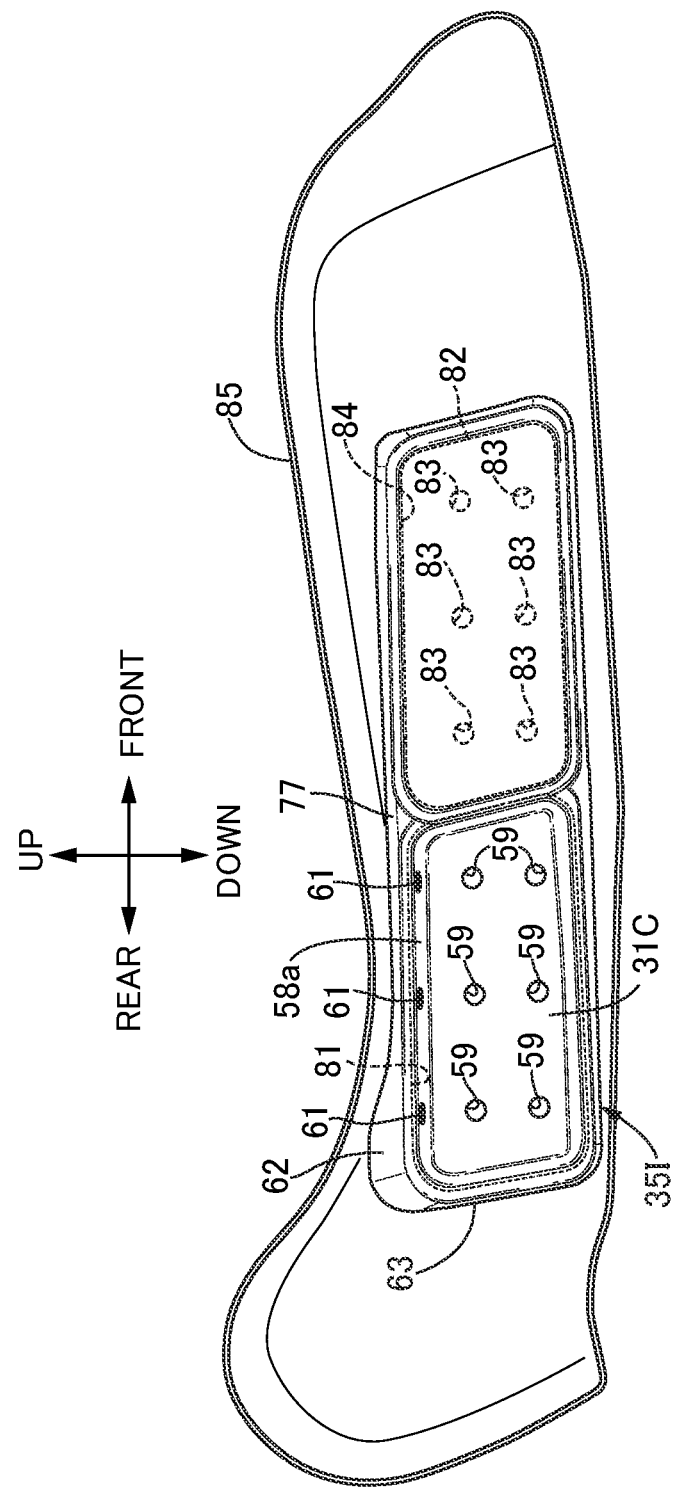
FIG. 18 is a side view, corresponding to FIG. 13, of an eleventh embodiment. (eleventh embodiment)

An eleventh embodiment of the present invention is explained by reference to FIG. 18; parts corresponding to those of the seventh to tenth embodiments are denoted by the same reference numerals and symbols and are only illustrated, detailed explanation thereof being omitted.

An intermediate member 35I that has the plate-shaped interposing part 31C opposing the left side frame 18a (see eighth embodiment) from the outside so as to be housed within a cover member 85 and having the plurality of through holes 59 bored therein is disposed between the first electric actuator 27 (see eighth embodiment) and the side frame 18a, and the intermediate member 35I is fixed to the cover member 85 as in the eighth embodiment.

The intermediate member 35I forms between itself and the cover member 85 a first resonance space 81 that is connected to an outer space via the through hole 59 formed in the plate-shaped interposing part 31C. The intermediate member 35I integrally has a plate wall part 82 that opposes the cover member 85 and has a plurality of through holes 83 bored therein, and a second resonance space 84 that is connected to the outer space via the through hole 83 is formed within the intermediate member 35I.

In accordance with the eleventh embodiment, noise generated from the first actuator 27 can be reduced by the first resonance space 81, and road noise reflected from the road surface can be reduced by the second resonance space 84. Therefore, an occupant seated on the seat cushion 12 can experience quietness well despite the sound generated from the electric motor 34 and road noise while traveling.

Embodiments of the present invention are explained above, but the present invention is not limited to the embodiments and may be modified in a variety of ways as long as the modifications do not depart from the subject matter.

For example, the plate-shaped interposing parts 31A, 31B, 31C may have a flat plate-shape or may be formed into a curved shape that bulges slightly toward the side going away from a sound generation source.

The invention claimed is:

1. A vehicle seat, comprising:
   a seat frame;
   a sound generation source that is disposed on an outside of the seat frame;
   a cover member that covers at least a part of the seat frame to cover the sound generation source; and
   an intermediate member that is disposed between the sound generation source and the cover member,
   wherein the intermediate member includes:
      a plate-shaped interposing part that has a plate shape, faces the sound generation source, is disposed along a vertical direction, and forms a first space between the cover member and the plate-shaped interposing part; and
      a side wall part that extends from an edge of the plate-shaped interposing part toward the sound generation source in a horizontal direction, forms a second space between the cover member and the side wall part, and is provided with a through hole,
   wherein the through hole is formed at a position facing the sound generation source in the side wall part and leads to the second space, and
   wherein
      the seat frame comprises a side frame that supports the sound generation source;
      the side wall part includes an upper wall portion that is disposed above the sound generation source; and
      the intermediate member includes a fold-back part that is folded back from an end part of the upper wall portion and extends toward a side going away from the sound generation source.

2. The vehicle seat according to claim 1, wherein
   the side wall part includes a lower wall portion that is disposed below the sound generation source, and
   a horizontal length of the upper wall portion is greater than a horizontal length of the lower wall portion.

3. The vehicle seat according to claim 1, wherein the side wall part includes a lower wall portion that is disposed below the sound generation source, and
   an end part of the upper wall portion is located at a position farther from the plate-shaped interposing part in the horizontal direction than a virtual vertical plane that contacts an end part of the lower wall portion.

4. The vehicle seat according to claim 1, wherein
   the fold-back part is formed as a continuous body without a hole.

5. The vehicle seat according to claim 1, wherein
   an edge of the fold-back part contacts the cover member without a gap.

6. The vehicle seat according to claim 1, wherein
   an edge of the fold-back part is fixed to the cover member without a gap.

7. The vehicle seat according to claim 1, further comprising:
   a load transmission member that is fixed to the cover member at a position away from the intermediate member in a vehicle fore-and-aft direction and transmits a collision load from a side of a vehicle to the seat frame.

8. The vehicle seat according to claim 7, wherein
   the intermediate member is formed integrally with the load transmission member.

* * * * *